(12) United States Patent
Mcilvaine

(10) Patent No.: US 11,988,197 B1
(45) Date of Patent: May 21, 2024

(54) WIND TURBINE

(71) Applicant: Clifford J. Mcilvaine, St. Charles, IL (US)

(72) Inventor: Clifford J. Mcilvaine, St. Charles, IL (US)

( * ) Notice: Subject to any disclaimer, the term of this patent is extended or adjusted under 35 U.S.C. 154(b) by 0 days.

(21) Appl. No.: 18/178,699

(22) Filed: Mar. 6, 2023

(51) Int. Cl.
*F03D 9/35* (2016.01)
*F03D 7/06* (2006.01)
*F03D 9/25* (2016.01)

(52) U.S. Cl.
CPC ........... *F03D 9/35* (2016.05); *F03D 7/06* (2013.01); *F03D 9/25* (2016.05); *F05B 2220/706* (2013.01); *F05B 2240/217* (2013.01); *F05B 2270/32* (2013.01)

(58) Field of Classification Search
CPC ..... F03D 9/35; F03D 7/06; F03D 9/25; F05B 2220/706; F05B 2240/217; F05B 2270/32
USPC ....................................... 290/44, 55
See application file for complete search history.

(56) References Cited

U.S. PATENT DOCUMENTS

| | | | | |
|---|---|---|---|---|
| 2,360,791 A * | 10/1944 | Putnam | ............... | F03D 7/0224 416/37 |
| 3,720,840 A * | 3/1973 | Gregg | ............... | F02C 1/02 290/55 |
| 4,070,131 A * | 1/1978 | Yen | ............... | F03D 13/20 415/4.4 |
| 4,127,356 A * | 11/1978 | Murphy | ............... | F03D 3/0463 415/4.1 |
| 4,398,096 A * | 8/1983 | Faurholtz | ............... | F03D 1/04 290/55 |
| 4,406,579 A * | 9/1983 | Gilson | ............... | F03D 3/049 415/909 |
| 4,433,552 A * | 2/1984 | Smith | ............... | E03B 3/28 62/93 |
| 5,977,649 A * | 11/1999 | Dahill | ............... | F03D 80/00 290/55 |
| 8,063,502 B1 * | 11/2011 | Voyles | ............... | F03D 15/20 290/55 |
| 8,067,852 B2 * | 11/2011 | Ortiz | ............... | B60W 10/26 290/55 |
| 8,207,625 B1 | 6/2012 | Cristo | | |
| 8,222,762 B2 * | 7/2012 | Borgen | ............... | H02K 7/09 290/55 |
| 8,853,881 B2 * | 10/2014 | Andrews Hoegg | ....... | F03D 1/04 290/55 |
| 10,669,935 B2 | 6/2020 | Kayara | | |
| 2006/0108809 A1 * | 5/2006 | Scalzi | ............... | B60L 8/00 290/55 |
| 2007/0241567 A1 * | 10/2007 | Platt | ............... | F03D 3/0427 290/55 |

(Continued)

*Primary Examiner* — Charles Reid, Jr.
(74) *Attorney, Agent, or Firm* — BUCHANAN INGERSOLL & ROONEY PC

(57) ABSTRACT

A wind turbine assembly include a housing, a turbine disposed in the housing and configured to rotate about an axis, the turbine including a rotor and a plurality of blades which protrude from an outer surface of the rotor, and a funnel configured to collect fluid stream energy through a fluid inlet opening and to direct at least a portion of the collected fluid stream energy into the housing and in a first direction toward the turbine, and the funnel and the housing are configured to rotate together about an axis independently of the turbine blades.

9 Claims, 13 Drawing Sheets

(56) References Cited

U.S. PATENT DOCUMENTS

| | | | |
|---|---|---|---|
| 2008/0303287 A1* | 12/2008 | Meheen | H02S 10/12 290/55 |
| 2009/0160195 A1* | 6/2009 | Culjak | F03D 9/25 290/55 |
| 2009/0230691 A1* | 9/2009 | Presz, Jr. | F03D 1/04 290/55 |
| 2010/0230973 A1* | 9/2010 | Ortiz | F03D 9/37 290/55 |
| 2012/0068466 A1* | 3/2012 | Gilbert | F24F 7/025 290/55 |
| 2012/0074705 A1* | 3/2012 | Stephens | F03D 80/70 290/55 |
| 2013/0001951 A1* | 1/2013 | Tai | F03D 1/04 290/55 |
| 2015/0108758 A1* | 4/2015 | Oakes | F03D 9/25 290/55 |
| 2015/0240786 A1* | 8/2015 | Dietzel | F03D 15/10 290/44 |
| 2016/0084227 A1* | 3/2016 | Krippene | F03D 3/04 290/55 |

* cited by examiner

WIND TURBINE

FIELD OF THE INVENTION

The present invention relates generally to wind turbines that rotate on a vertical axis.

BACKGROUND

There are many benefits to increasing usage of renewable energy, from helping protect the environment to reducing dependency on foreign energy sources. There has been particularly increased interest in recent years in wind energy. Wind farms have become a significant source of energy as wind turbine technology has improved in efficiency and gained greater public acceptance. However, wind turbine designs currently in use remain of limited flexibility and efficiency and cannot operate in high wind storms. Some wind turbine designs are only feasible for use in relatively remote areas, while others lose their effectiveness at high wind speeds. Accordingly, a need exists for wind turbine designs of improved efficiency and flexibility, that can operate with wind from 5 to 175 mph, or greater, and in storms when the power is otherwise out.

SUMMARY

A wind turbine assembly includes a housing, a turbine disposed in the housing and configured to rotate about an axis, the turbine including a rotor and a plurality of blades which protrude from an outer surface of the rotor, and a funnel configured to collect fluid stream energy through a fluid inlet opening and to direct a huge portion of the collected fluid stream energy into the housing and in first and second directions at the same time toward the turbine blades. The funnel and the housing are configured to rotate together about an axis independently of the turbine blades.

A wind turbine assembly includes a housing, a turbine disposed in the housing and configured to rotate about an axis, the turbine including a rotor and a plurality of blades which protrude from an outer surface of the rotor, and a funnel configured to collect fluid stream energy through fluid inlet openings at both sides of the axis shaft blades at the same time. The wind turbine assembly is configured to direct the fluid stream energy collected by the funnel into the housing and toward the turbine blades at the same time. The funnel is configured to have a large fluid stream inlet opening when speed of the fluid stream is below a predetermined setting and will automatically reduce to a smaller fluid inlet opening when the speed of the fluid stream reaches a predetermined setting.

DETAILED DESCRIPTION

Set forth below with reference to the accompanying drawings is a detailed description of embodiments of a wind turbine assembly, representing examples of an inventive wind turbine assembly.

Figure 1:
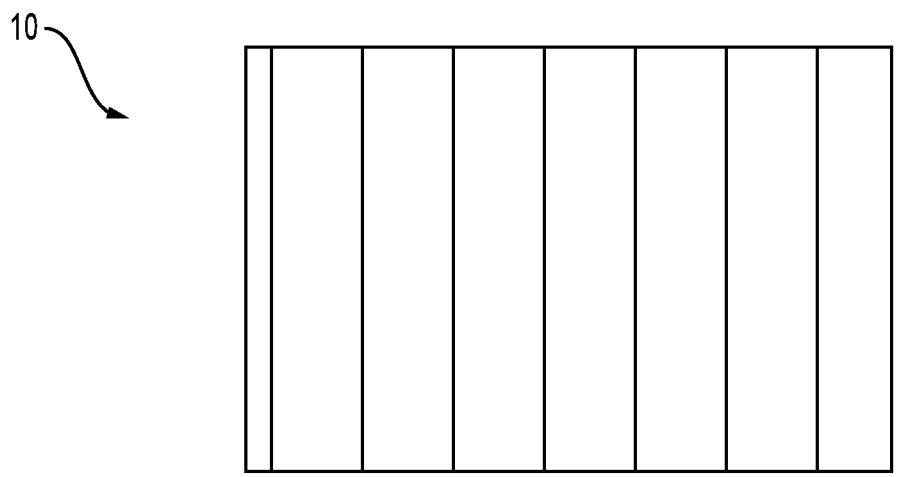
FIG. 1 is a side view of a turbine assembly according to exemplary embodiments of the present application.
Figure 2:
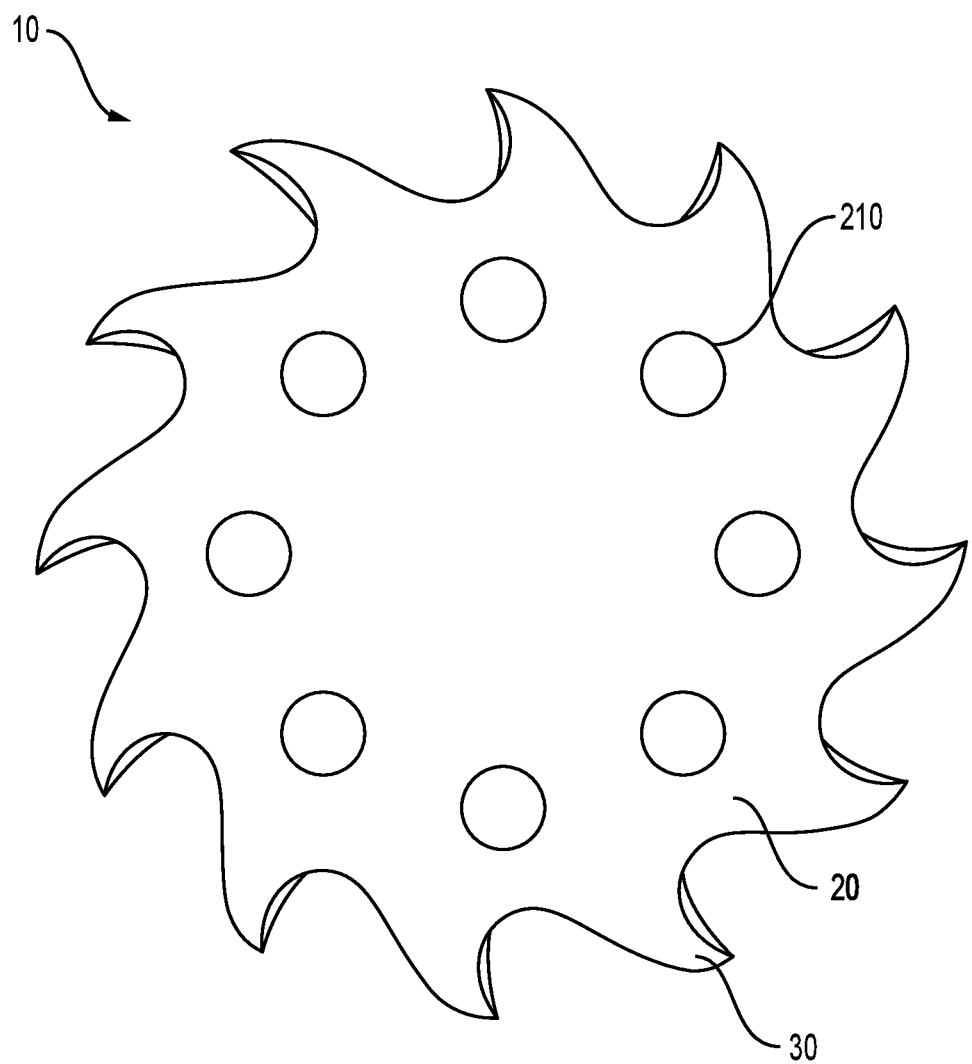
FIG. 2 is a top view of a turbine assembly according to exemplary embodiments of the present application.

Wind turbine assemblies according to exemplary embodiments disclosed in this application use a turbine 10 as illustrated in FIGS. 1 and 2. The turbine 10 is configured to rotate about an axis, the turbine 10 including a rotor 20 and a plurality of blades 30 which protrude from an outer surface of the rotor 20. The blades 30 are curved (in the top view, in the counterclockwise direction) so that fluid stream energy, such as moving air, directed toward any side of the turbine 10 will cause the turbine to rotate, when viewed from the top view, in the clockwise direction. In the embodiment, the cross-section of the turbine 10, taken in a plane perpendicular to the vertical axis, is substantially the same. In other words, in the embodiment, the blades 30 have a substantially constant shape from top-to-bottom.

The turbine 10 can be made of any robust, solid, material, such as plastic, stainless steel, fiberglass, cast iron. A preferable material is non magnetic Stainless Steel. In the embodiment, the turbine 10 is 6 feet in diameter and 3 feet high. The turbine 10 is configured to spin at 5000 RPM or greater and is mechanically connected to generator 110 by, for example, a pulley and belt structure or other means, with a pulley 120 rotating with the turbine 10, another pulley 140 rotating with a generator 110, and a belt 150 connected to both pulleys. The generator 110 is configured to generate electrical energy, or other power take-off energy, as it is rotated by the turbine 10. Because the pulleys 120 and 140 are disposed side-by-side, only one is visible in each of the views of FIGS. 5 and 6. Furthermore, the turbine blade housing can act as its own generator by winding coils made of, for example, copper wires, or a special iron/copper wire, on the stationary housing and embedding permanent ceramic magnets into the rotor. An example of an arrangement of embedded ceramic magnets 210 is illustrated in FIG. 2.

Figure 3:
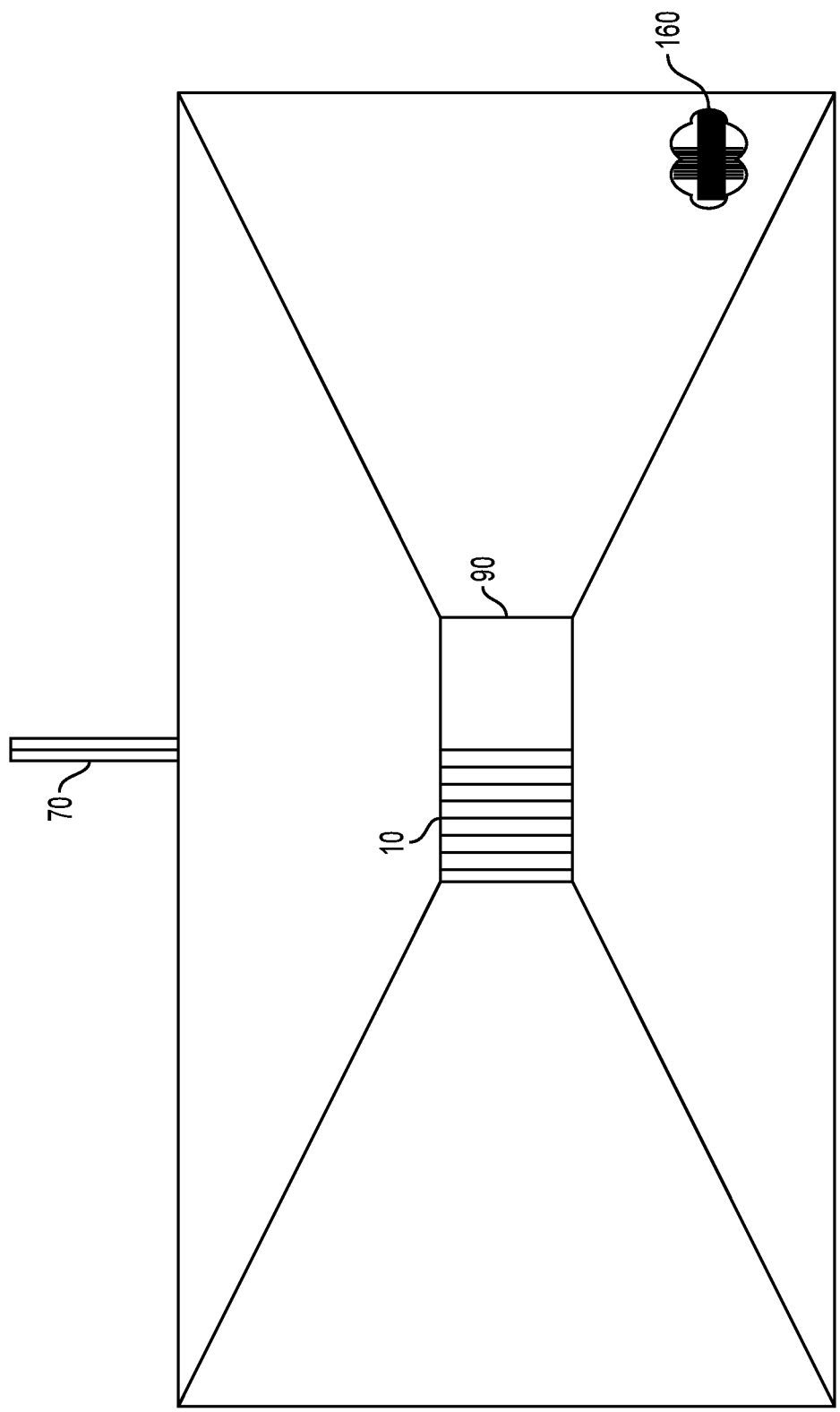
FIG. 3 is a front view of a wind turbine assembly according to a first embodiment.
Figure 4:
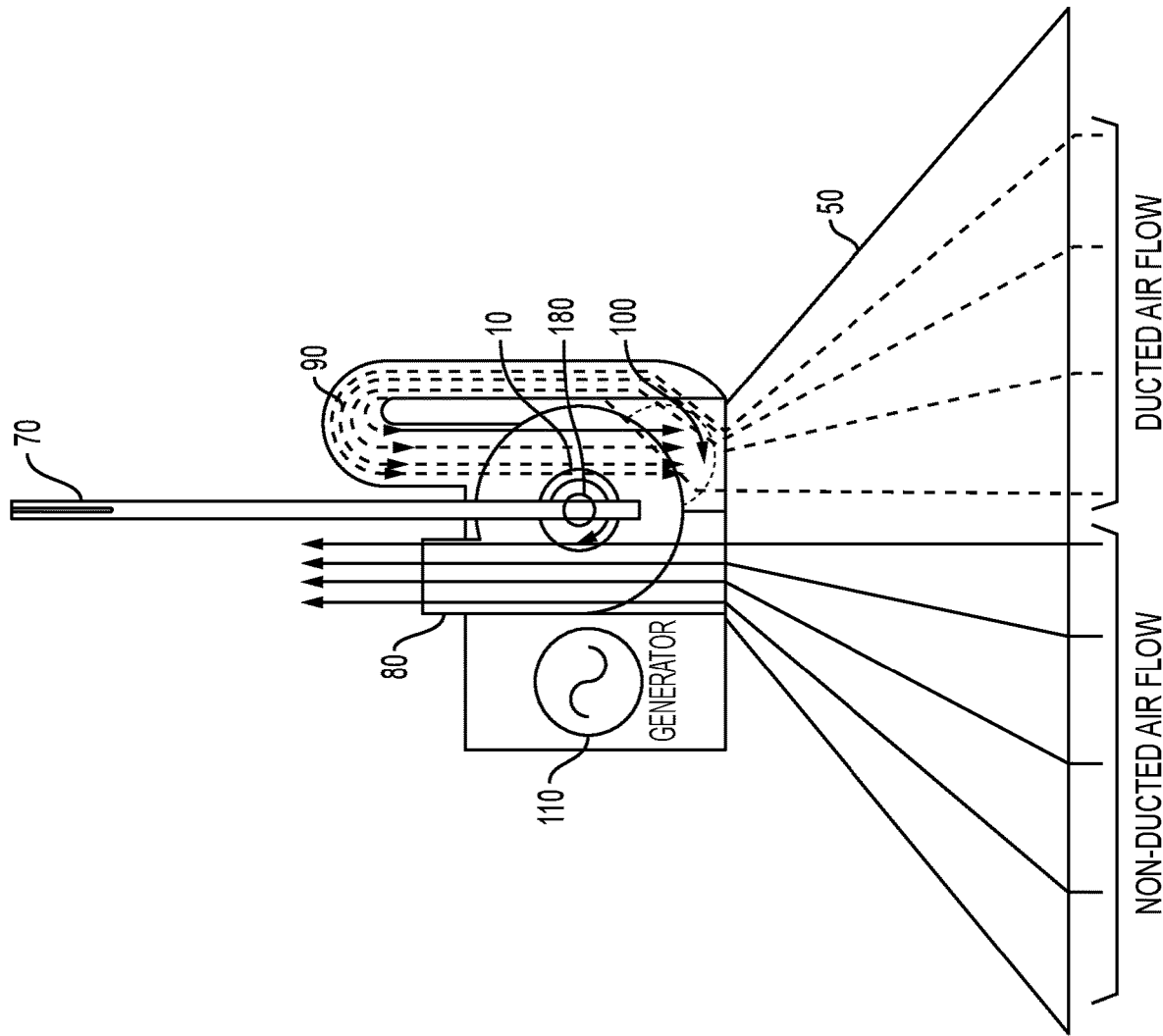
FIG. 4 is a top schematic view of a wind turbine assembly according to a first embodiment.
Figure 5:
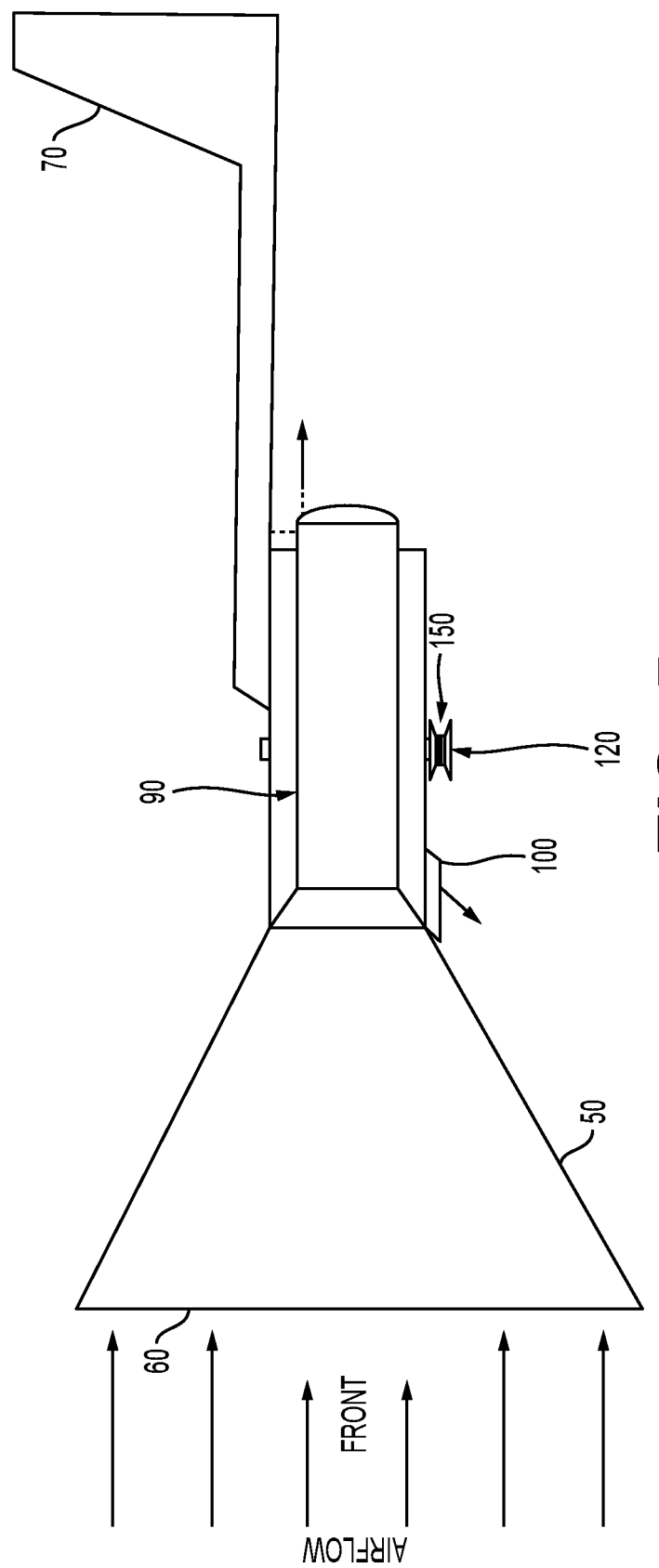
FIG. 5 is a right side view of a wind turbine assembly according to a first embodiment.
Figure 6:
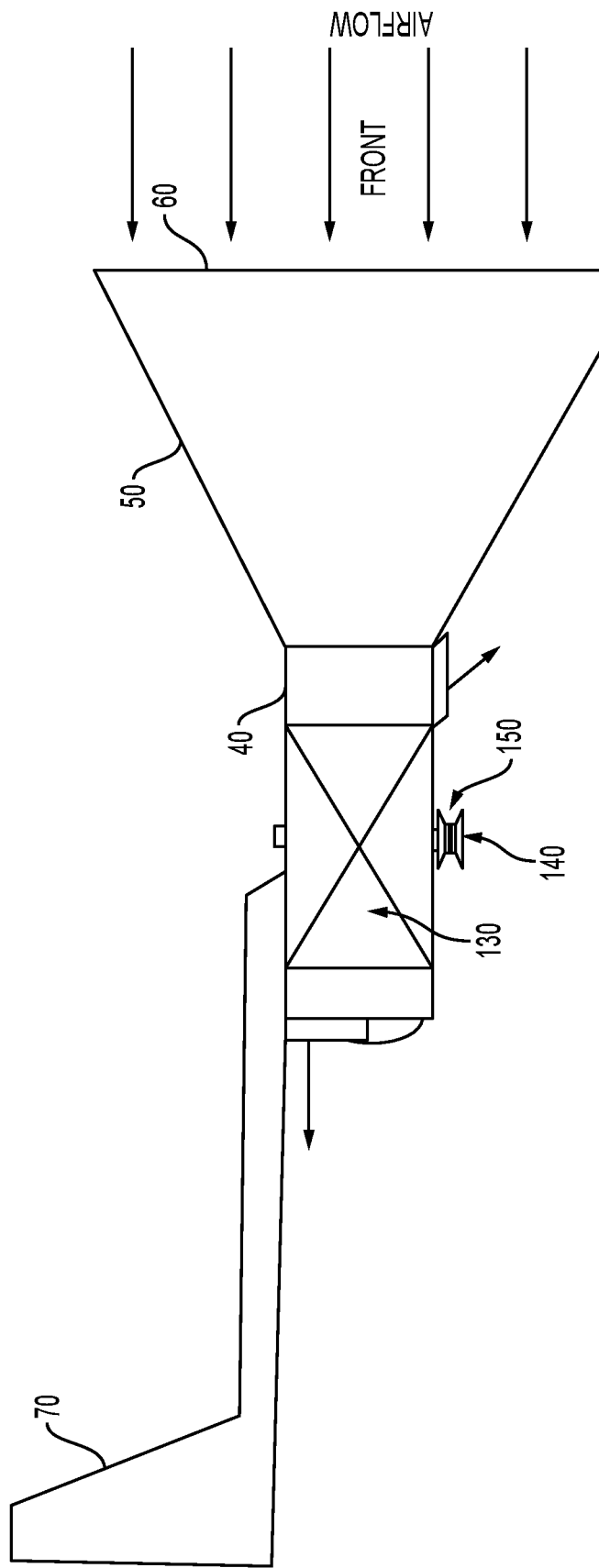
FIG. 6 is a left side view of a wind turbine assembly according to a first embodiment.

In the embodiment illustrated in FIGS. 3-6, the turbine 10 is disposed in a housing 40. In particular, the turbine 10 is mounted to at least one magnetic turbine bearing 180 that is also mounted to the housing 40, so that the turbine 10 is rotatable relative to the housing 40. Furthermore, the housing 40 is also mounted to at least one magnetic housing bearing, so that the housing 40 can rotate about an axis relative to the structure that the housing 40 is mounted on. The turbine 10 and housing 40 rotate about the same axis, but can rotate independently of one another because they are mounted to separate magnetic bearings. The generator 110 is mounted in a generator housing 130 which is attached to the housing 40, as illustrated in FIGS. 4 and 6. The respective magnetic bearings can be provided below, and also above for additional support, their respective structures. By using solely high-quality magnetic bearings, the turbine can operate anywhere in the world with minimal failure. The turbine could also operate with standard lubricant-based bearings.

Attached to a front side of the housing 40 is a funnel 50 that is fixed to the housing 40 so that it rotates with the housing 40. The funnel 50 is configured to collect fluid stream energy through a fluid stream inlet opening 60. As can be seen in FIGS. 3 and 4, a portion of the collected fluid stream energy (the left side in the figures) is directed directly into the housing 40 to impinge on the blades of the turbine 10 in a first direction (upward when viewed in FIG. 4). The funnel 50 may have a 2 inch grid 160 affixed to the front to prevent, for example, large objects from entering the funnel 50, and to strengthen the funnel front. On a rear side of the housing 40 is an exhaust opening 80 which is configured to exhaust the fluid stream that was directed directly into the housing 40, after the fluid stream has imparted kinetic energy to the blades of the turbine 10, as illustrated in FIG. 4.

Attached to the top of the housing 40 is a vane 70 that is fixed to the housing 40 that keeps housing pointed into the fluid stream. As illustrated in FIGS. 4-6, the vane 70 is configured to rotate the housing 40 and funnel 50 so that the fluid inlet opening 60 always faces directly into the fluid stream and the first direction coincides with the direction of the fluid stream.

As illustrated in FIGS. 3-5, intake ducting 90 is fixed to the housing 40 to rotate together with the housing 40 and the funnel 50. The intake ducting 90 is connected to the funnel 50 so that the other portion of the collected fluid stream energy (the right side in FIGS. 3 and 4) is directed into the housing 40 and toward the turbine 10 in a second direction (downward when viewed in FIG. 4) opposite the first direction. As illustrated in FIGS. 4 and 5, the intake ducting 90 thus turns the fluid stream energy of the right-side portion of the collected fluid stream energy 180 degrees before directing it toward the blades of the turbine 10. After imparting fluid stream energy to the blades of the turbine 10, this ducted fluid is then vented out the bottom of the housing 40 by exhaust ducting 100. By directing a portion of the collected fluid stream to a first side of the blades and the other portion to the second side of the blades at the same time, all of the usable fluid stream energy can be collected and used, as opposed to conventional vertical axis turbines which can only use half, i.e., the turbine according to the present application is twice as efficient.

Figure 7:
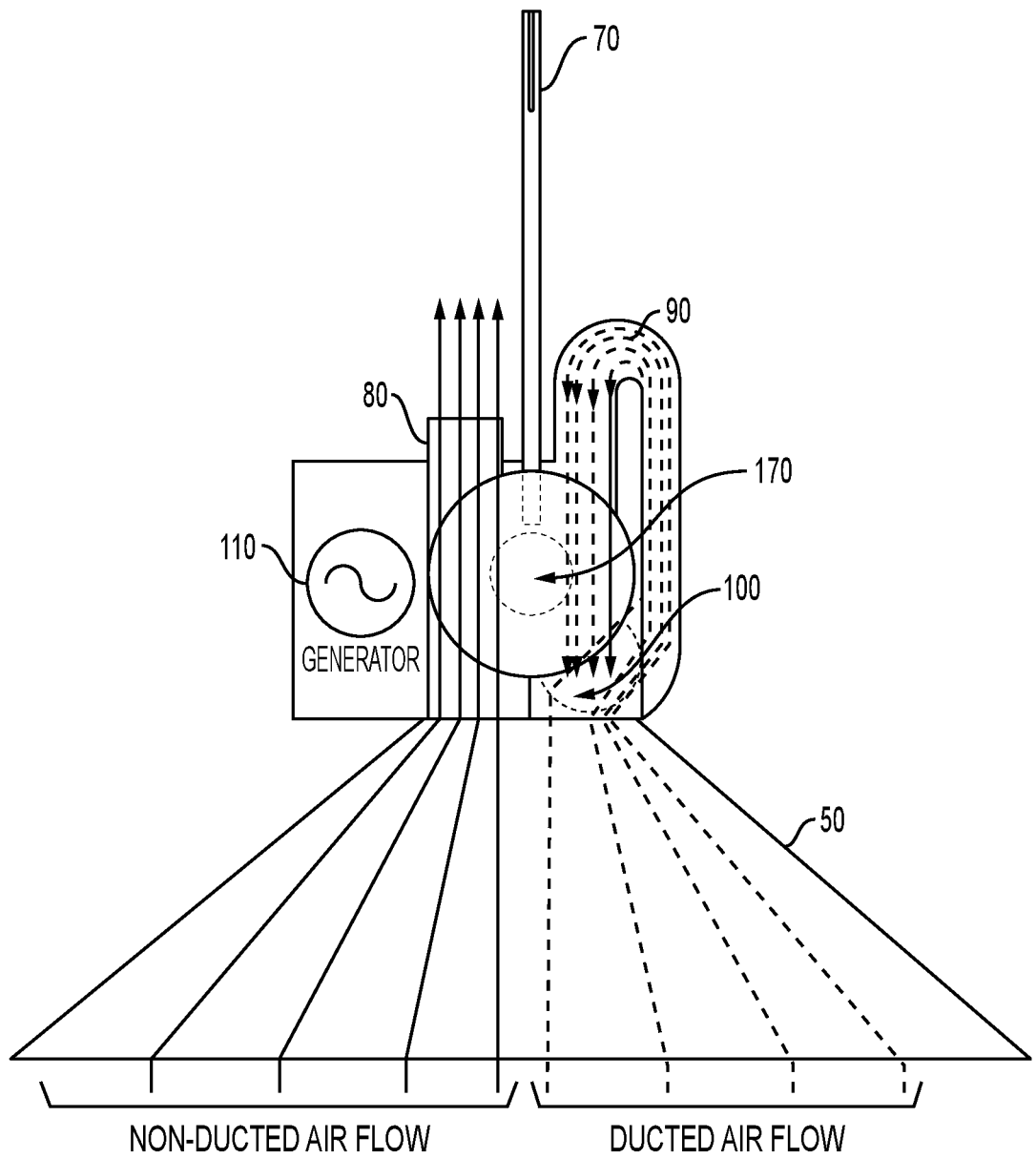
FIG. 7 is a top schematic view of a wind turbine assembly according to a second embodiment.
Figure 8:
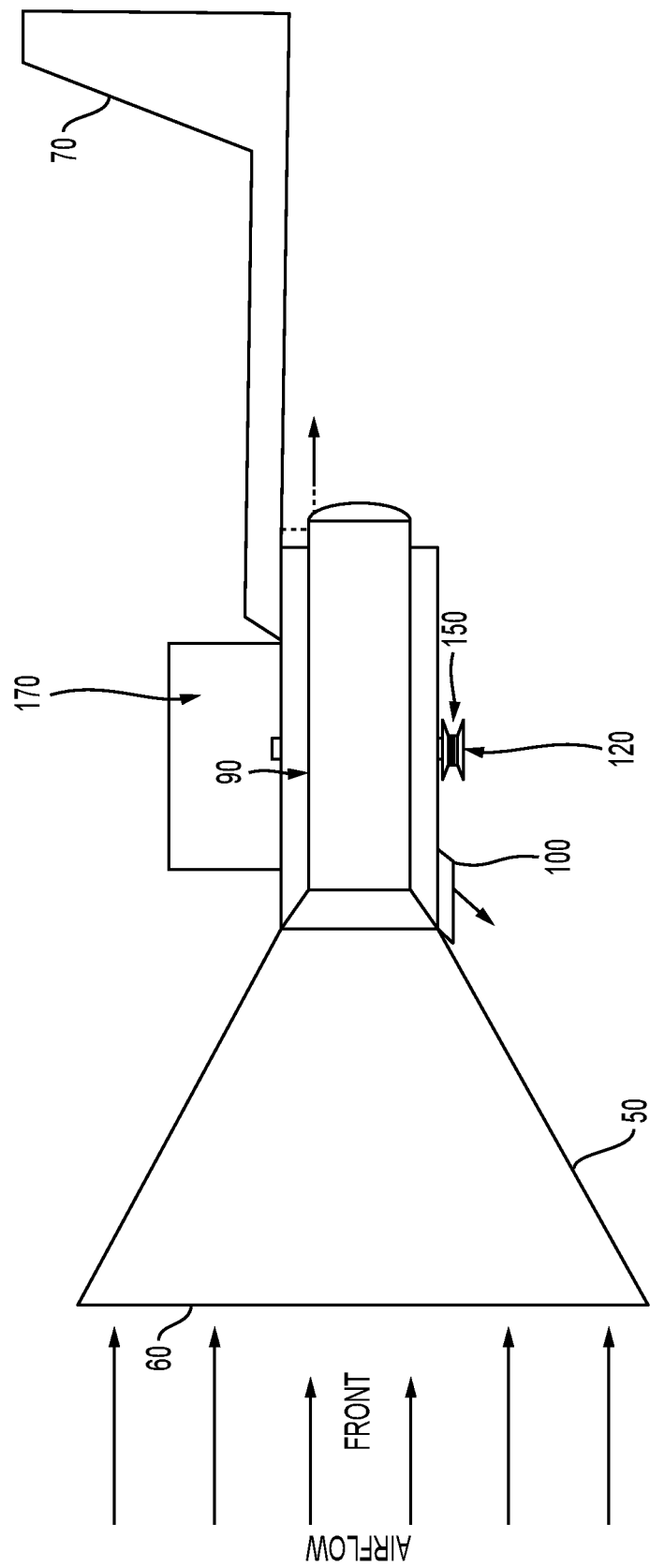
FIG. 8 is a right side view of a wind turbine assembly according to a second embodiment.
Figure 9:
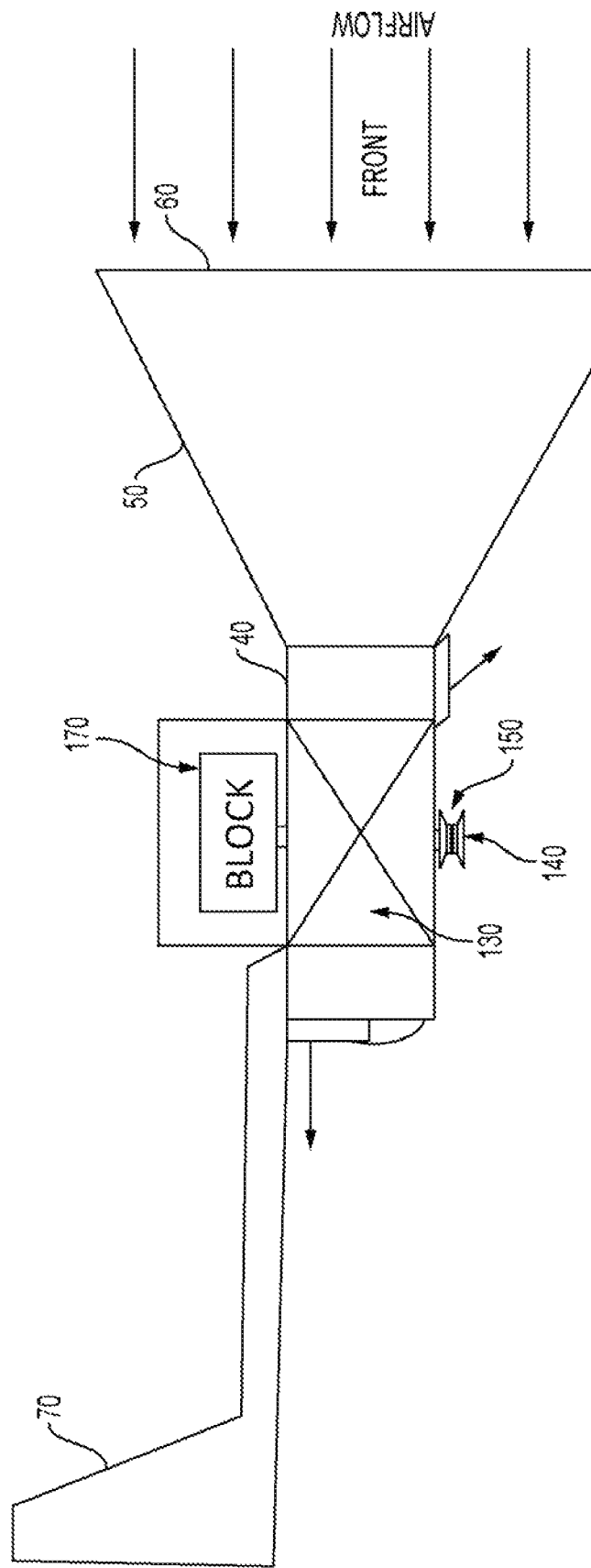
FIG. 9 is a left side view of a wind turbine assembly according to a second embodiment.

FIGS. 7-9 illustrate a wind turbine assembly according to a second embodiment. The second embodiment is similar to the first embodiment, save for the provision of an additional second generator 170 contained in a high vacuum chamber and supported by magnetic bearings, and electromagnetically coupled with the rotor of the turbine 10. In particular, this additional second generator 170 comprises a large heavy block of material supported on top and bottom by magnetic bearings, and contained inside a non-magnetic stainless steel high vacuum chamber. Alternatively, the high vacuum chamber can be made of glass. The electromagnetic coupling can be turned on and off as needed, and thus, the second generator 170 can store kinetic energy 20 or 50 times better due to its heavy mass and use of magnetic bearings, for example, during low fluid stream conditions. The second generator 170 thus functions as an additional energy storage device, in place of batteries, and does not wear out.

Figure 10:
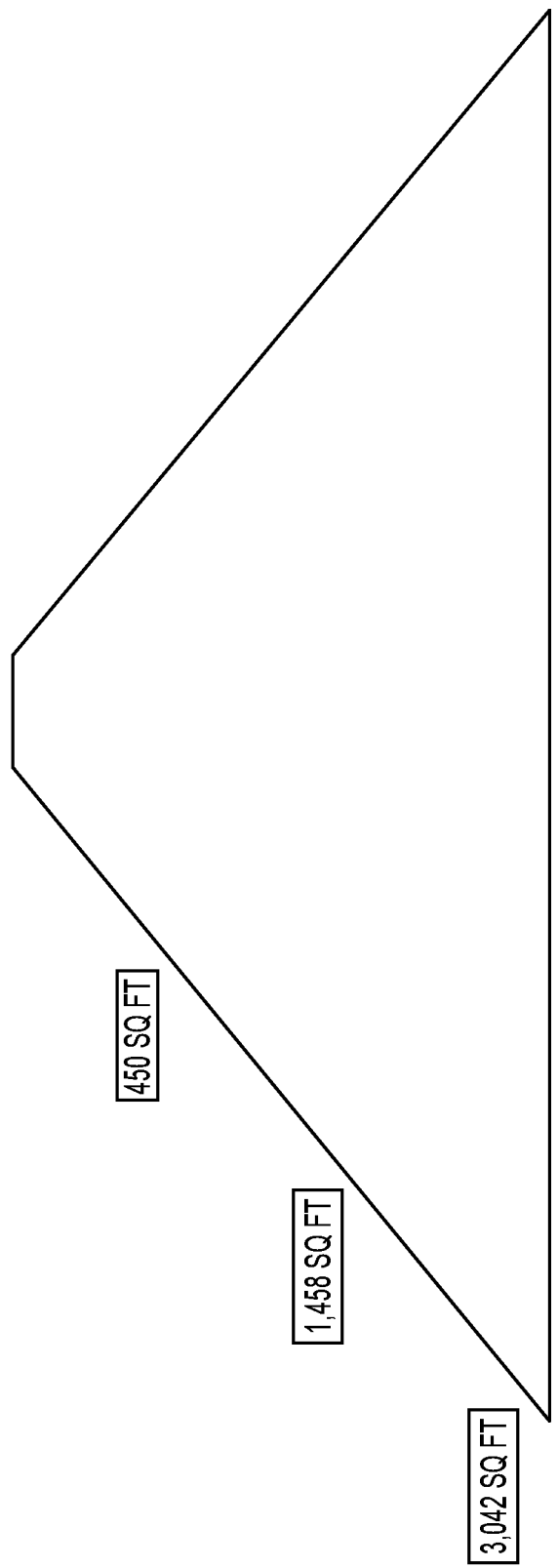
FIG. 10 is a top view of an expandable funnel of a wind turbine assembly according to exemplary embodiments of the present application.
Figure 11:
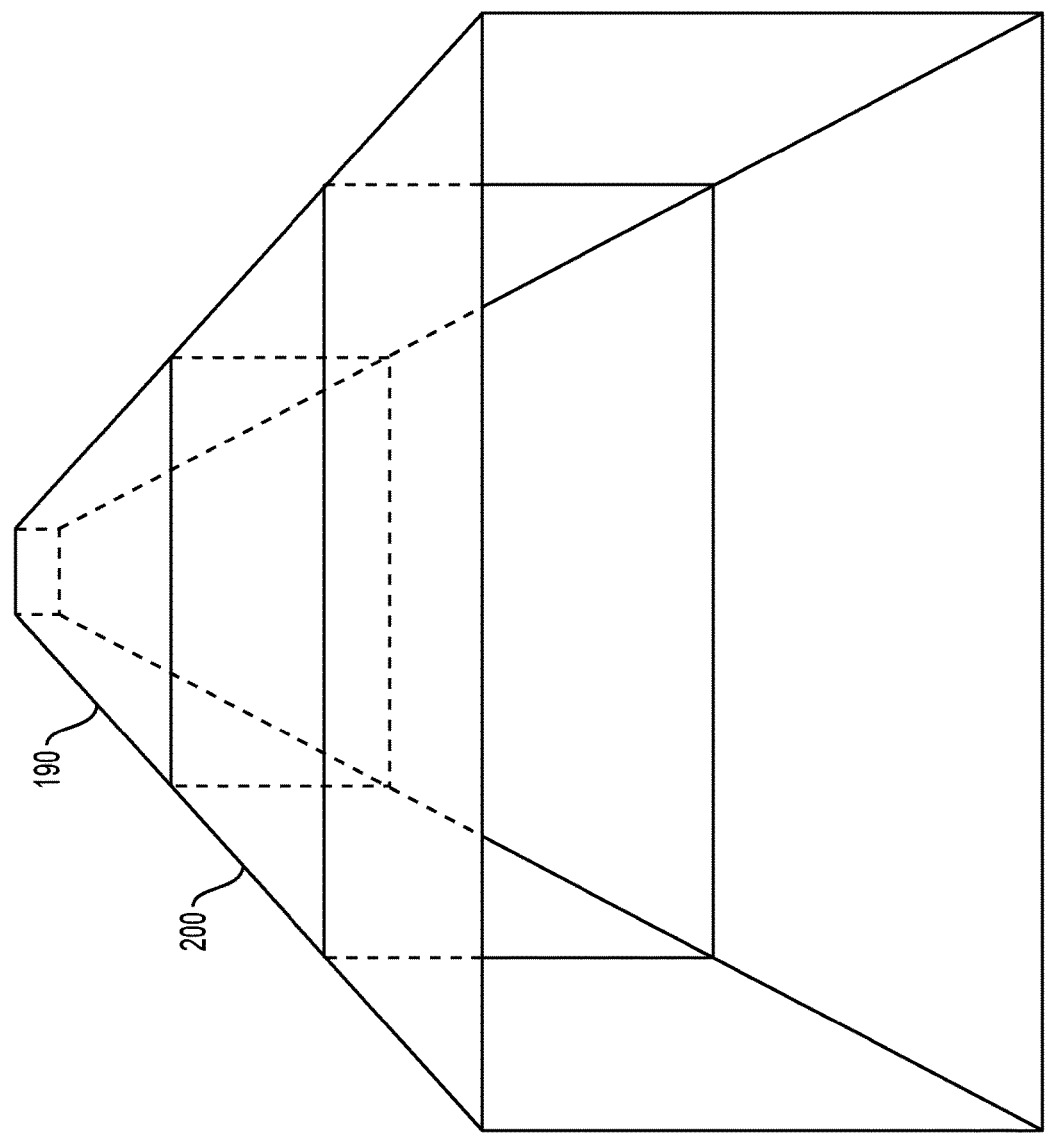
FIG. 11 is a front schematic view of an expandable funnel of a wind turbine assembly according to exemplary embodiments of the present application.

The funnel 50 can be a fixed-size funnel, at the same time can be a variable sized funnel, as illustrated in FIGS. 10-11. This funnel is configured to have a large fluid stream inlet opening when the pressure of the fluid stream is below a predetermined setting and will automatically reduce to a smaller fluid stream inlet opening when the pressure of the fluid stream assumes the predetermined value. The funnel 50 has a main fiberglass funnel 190, which is ten feet deep by 15 feet high and 30 feet wide, that is fixed. The remaining panels 200 are collapsible, such as by folding back (i.e., origami technique), sliding back, or, if made of flexible material like a sail for example, will simply lose their shape under high fluid stream conditions. In the illustrated embodiment, there are eight collapsible panels 200, one of which is labeled in FIG. 11.

Wind turbine assemblies according to the foregoing description can be provided in smaller sizes, for example, on the top of a building, and are also scalable to larger sizes, for example, with a turbine having a diameter of 200 to 300 feet, as the greater the mass in assemblies according to the foregoing, the greater the efficiency. A smaller-sized wind turbine assembly can also be configured to be operatively mounted to an electric vehicle so as to extend its range. Furthermore, as the funnel assembly can be mass-produced at different sizes, production of wind turbine assemblies according to the foregoing can be efficiently provided at a large scale. Additionally, in the embodiment illustrated in FIGS. 12-14, the funnel can be raised 200 or more feet above the ground, with the turbine being on the ground or on a rooftop.

Figure 12:
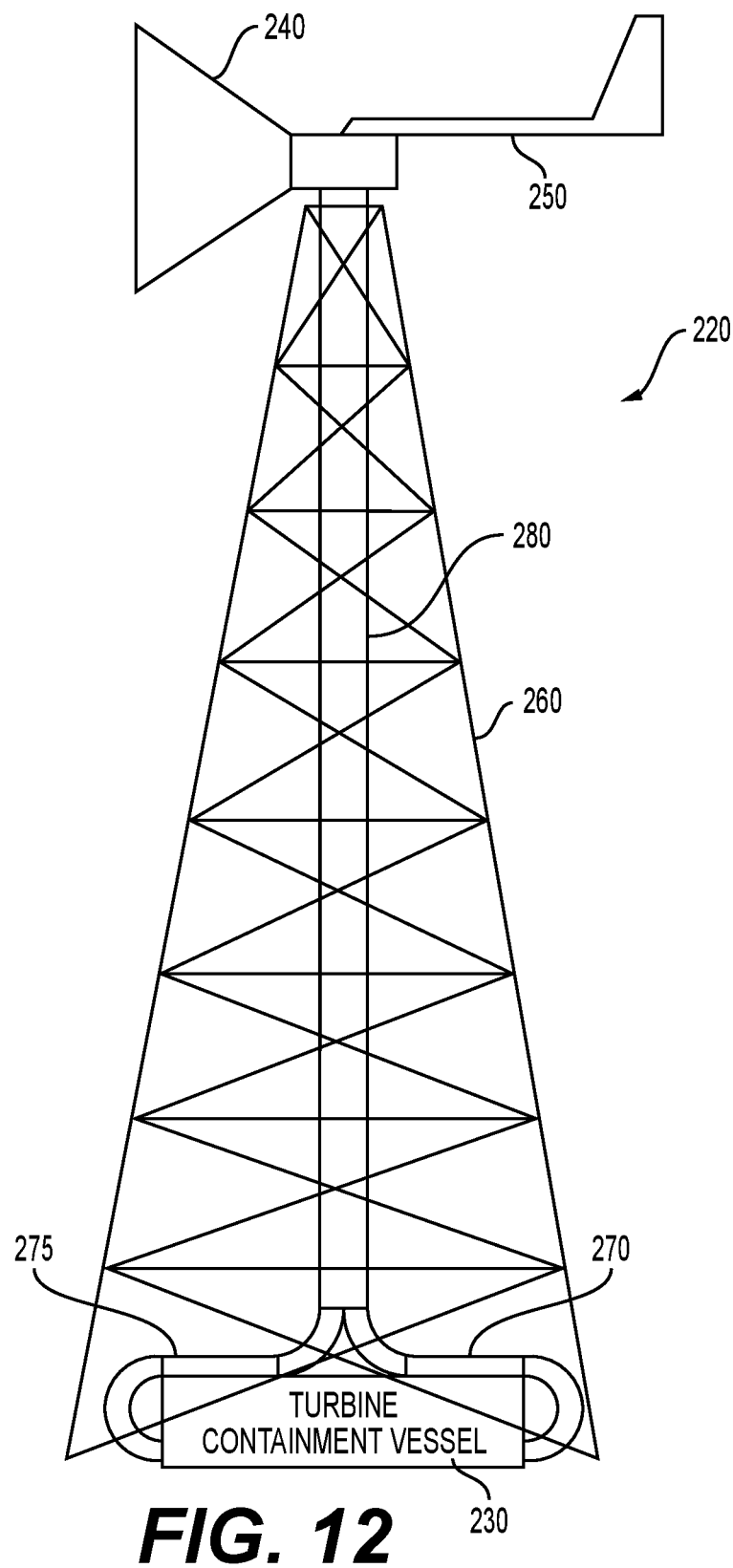
FIG. 12 is a side view of a wind turbine assembly according to a third embodiment.
Figure 13:
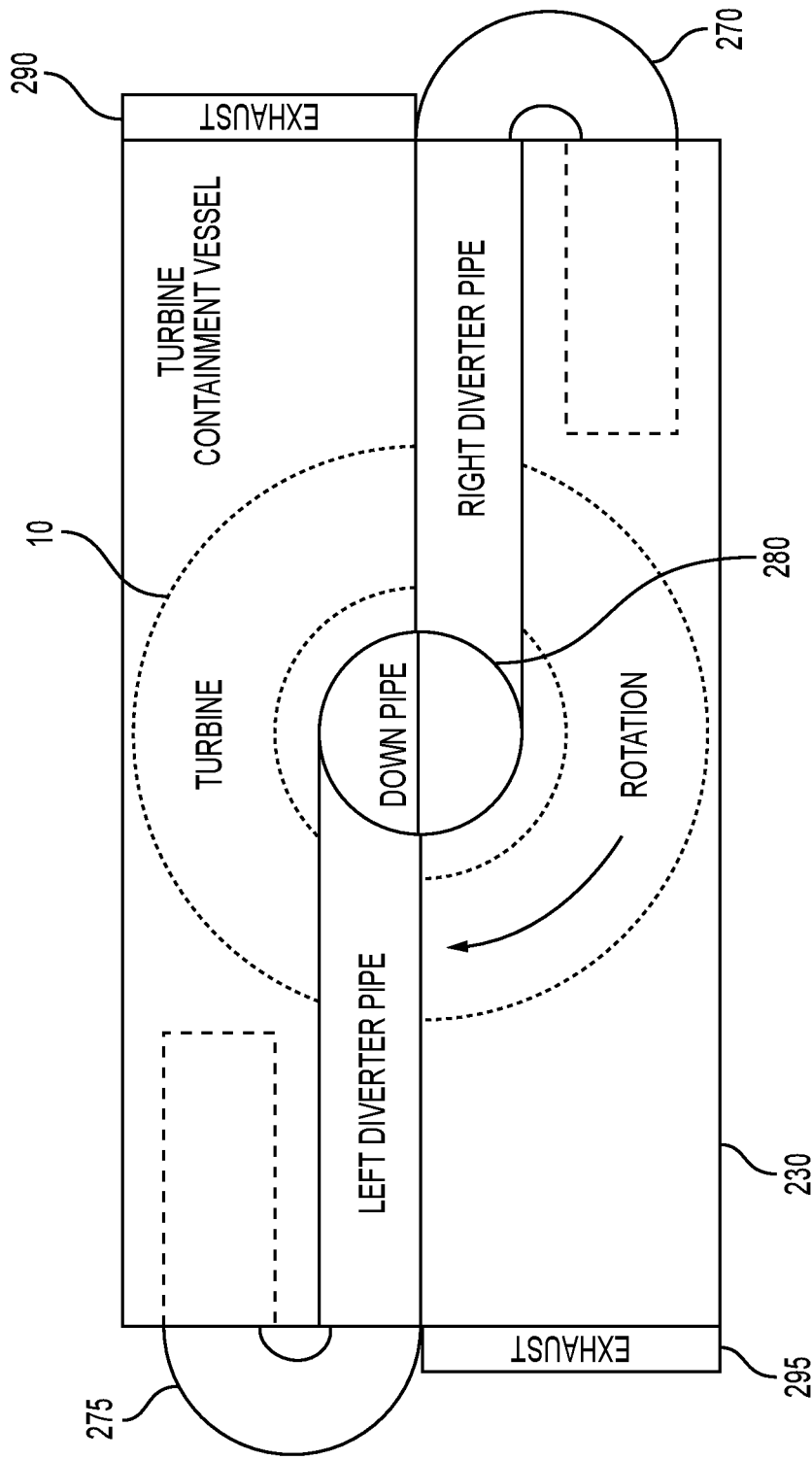
FIG. 13 is a partial overhead schematic view of a wind turbine assembly according to a third embodiment.
Figure 14:
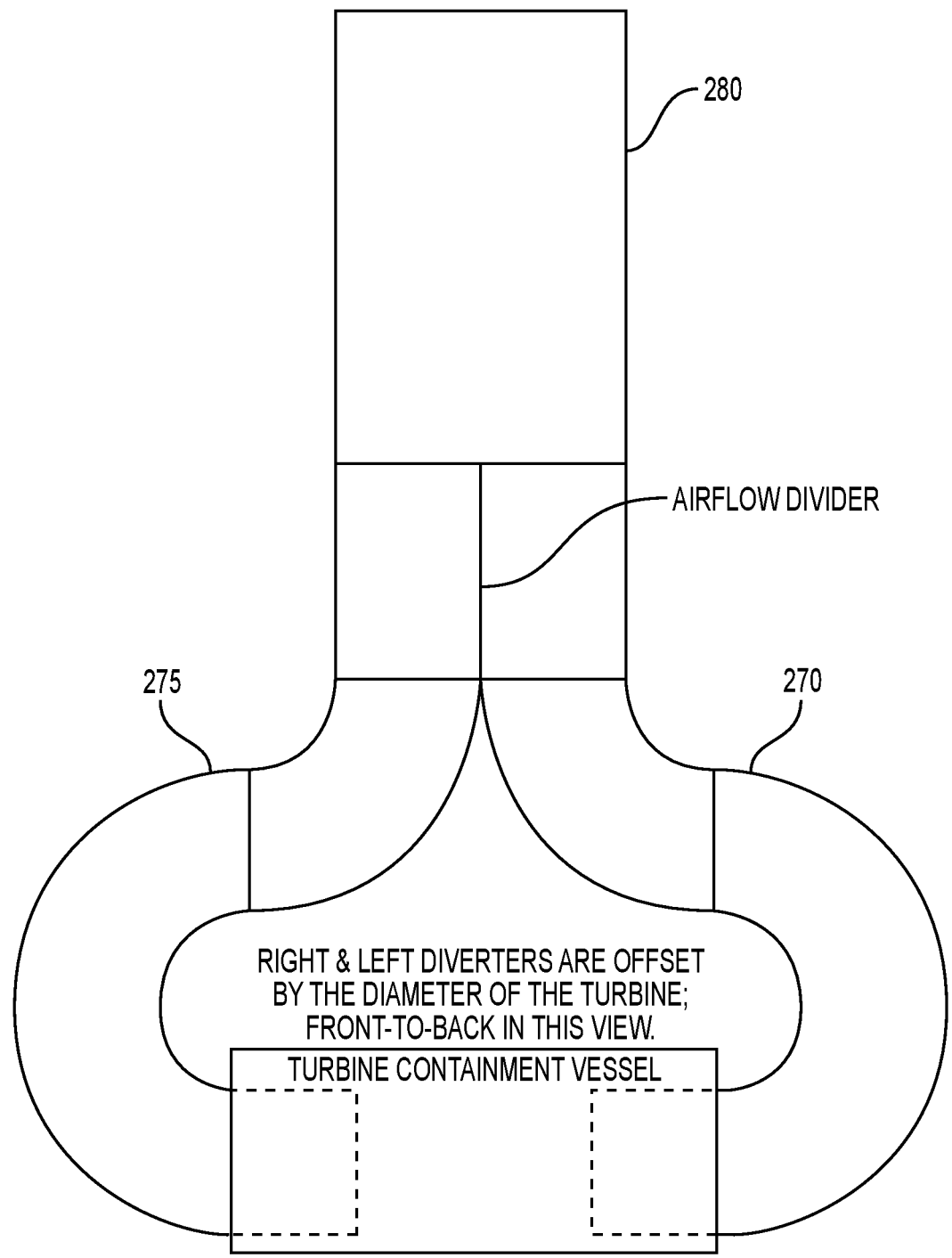
FIG. 14 is a detail schematic partial side view of a wind turbine assembly according to a third embodiment.

This wind turbine assembly 220 of the embodiment of FIGS. 12-14 includes a fixed housing 230. As in the previous embodiment, disposed in the housing 230 is a turbine 10 configured to rotate about an axis and including a rotor 20 and a plurality of blades 30 which protrude from an outer surface of the rotor 20. Furthermore, there is a funnel 240 configured to rotate about an axis independent of the turbine 10. and a vane 250 configured to cause the funnel 240 to rotate such that its fluid inlet opening always faces into the fluid stream.

The funnel 240 can be supported, for example, several hundred feet above the ground by a supporting structure 260, which also supports a fixed vertical duct 280 that delivers the collected fluid stream energy from the funnel 240 to intake ducts 270 and 275. The intake ducts 270 and 275 each take a portion of the collected fluid stream energy and deliver it to the turbine 10 on opposite sides in offset fashion, as illustrated in FIGS. 13 and 14. Furthermore, the spent fluid stream is exhausted at exhausts 290 and 295 built into the housing 230.

The detailed description above describes embodiments of a wind turbine assemblies. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:
1. A fluid turbine assembly comprising:
   a housing;
   a turbine located inside the housing and configured to rotate about a rotational axis, the turbine including a rotor having an outer surface and a plurality of blades which protrude from the outer surface of the rotor;

a funnel configured to collect and convey fluid stream energy into the housing through a fluid inlet opening and direct the collected fluid stream energy into the housing in a first direction toward the outer surface of the rotor, the first direction being perpendicular to the rotational axis, said funnel having a front entry, wherein the turbine is configured to rotate about the rotational axis independently of the funnel and the housing, wherein the funnel and the housing are configured to rotate together about the rotational axis independently of the turbine.

2. The fluid turbine assembly according to claim 1, wherein the housing includes an exhaust opening configured to exhaust the collected fluid stream energy from the housing after the collected fluid stream energy has imparted the fluid stream energy to the turbine blades.

3. The fluid turbine assembly according to claim 1, wherein the funnel is configured to direct the collected fluid stream energy into the housing in the first direction toward the turbine blades, and the fluid turbine assembly further comprises an intake ducting part of the funnel, configured to direct the collected fluid stream energy into the housing and toward the turbine blades in a second direction opposite the first direction.

4. The fluid turbine assembly according to claim 1, further comprising a generator mechanically connected to the turbine to generate electrical energy as the turbine rotates about the rotational axis.

5. The fluid turbine assembly according to claim 1, further comprising magnetic bearings supporting the turbine and the housing.

6. The fluid turbine assembly according to claim 1, wherein the turbine is 200 to 300 feet in diameter.

7. The fluid turbine assembly according to claim 1, further comprising a generator mechanically connected to the turbine to generate power take-off energy as the turbine rotates about the rotational axis.

8. A fluid turbine assembly comprising:

a housing;

a turbine placed inside the housing and configured to rotate about a rotational axis, the turbine including a rotor and a plurality of blades which protrude from an outer surface of the rotor;

a funnel assembly configured to collect a fluid stream energy through a fluid inlet opening;

and an intake ducting part of the funnel assembly configured to direct the collected fluid stream energy into the housing and in a first direction toward the outer surface of the rotor, the first direction being perpendicular to the rotational axis, and to direct the collected fluid stream energy into the housing and toward the turbine blades in a second direction opposite the first direction at the same time;

wherein the turbine is configured to rotate about the rotational axis independently of the funnel assembly;

wherein the funnel assembly is configured to rotate about the rotational axis independently of the turbine.

9. The fluid turbine assembly according to claim 8, further comprising a continuous 300 degree smooth fluid pathway around the rotor, which allows the turbine to rotate by collecting a fluid stream energy continuously around the rotor.

\* \* \* \* \*

UNITED STATES PATENT AND TRADEMARK OFFICE
CERTIFICATE OF CORRECTION

PATENT NO. : 11,988,197 B1
APPLICATION NO. : 18/178699
DATED : May 21, 2024
INVENTOR(S) : Clifford J. McIlvaine It is certified that error appears in the above-identified patent and that said Letters Patent is hereby corrected as shown below:

On the Title Page

Item (12) should read --McIlvaine--.

Item (71) Applicant, should read --Clifford J. McIlvaine, St. Charles, IL (US)--.

Item (72) Inventor, should read --Clifford J. McIlvaine, St. Charles, IL (US)--.

Signed and Sealed this
First Day of October, 2024

Katherine Kelly Vidal
*Director of the United States Patent and Trademark Office*